United States Patent
Herb

(10) Patent No.: US 7,543,788 B2
(45) Date of Patent: Jun. 9, 2009

(54) MOUNTING FASTENING

(75) Inventor: Armin Herb, Apfeldorf (DE)

(73) Assignee: Hilti Aktiengellschaft, Schaan (LI)

( * ) Notice: Subject to any disclaimer, the term of this patent is extended or adjusted under 35 U.S.C. 154(b) by 487 days.

(21) Appl. No.: 11/053,404

(22) Filed: Feb. 8, 2005

(65) Prior Publication Data

US 2005/0173363 A1    Aug. 11, 2005

(30) Foreign Application Priority Data

Feb. 9, 2004    (DE)    ........................ 10 2004 006 204

(51) Int. Cl.
*A47B 96/06* (2006.01)

(52) U.S. Cl. .................. 248/228.1; 248/292.14; 248/288.31; 248/299.1

(58) Field of Classification Search ........... 403/71, 403/70, 87, 161, 113, 115, 116; 248/299.1, 248/292.14, 227.3, 228.1, 288.31, 181, 181.2, 248/481; 52/704, 710, 39; 411/104, 537, 411/538
See application file for complete search history.

(56) References Cited

U.S. PATENT DOCUMENTS

| | | | | |
|---|---|---|---|---|
| 880,415 A | * | 2/1908 | Stevens | ........................ 384/417 |
| 1,491,571 A | * | 4/1924 | Tomkinson et al. | ........... 52/708 |
| 1,578,634 A | * | 3/1926 | Borgmann | ..................... 403/71 |
| 2,641,513 A | * | 6/1953 | Fryda | .......................... 403/71 |
| 2,953,874 A | | 9/1960 | Kindorf | |
| 3,081,114 A | * | 3/1963 | Esty | ............................. 403/71 |
| 3,145,005 A | * | 8/1964 | Wester | ........................ 248/515 |
| 4,565,345 A | * | 1/1986 | Templeman | ................. 248/481 |
| 4,568,121 A | * | 2/1986 | Kashima | ................. 297/215.15 |
| 4,666,109 A | | 5/1987 | Fallon et al. | |
| 6,796,760 B1 | * | 9/2004 | Tanner | ........................ 411/107 |
| 7,189,043 B2 | * | 3/2007 | Benoit et al. | ................. 411/104 |

FOREIGN PATENT DOCUMENTS

| | | |
|---|---|---|
| DE | 19946222 C1 | 4/2001 |
| EP | 0452256 | 10/1991 |
| EP | 0620395 | 10/1994 |

* cited by examiner

*Primary Examiner*—Gwendolyn Baxter
(74) *Attorney, Agent, or Firm*—Abelman, Frayne & Schwab

(57) ABSTRACT

A mounting construction (1) for suspended loads (L) has a support connector part (3, 3') with a fastener device having a pivot element socket (4) and having an associated pivot nut (5), pivotably fixable in at least one pivot plane (1*a*, 1*b*), having an inside thread (6). The pivot element socket (4) has a guide slot (8) along a first pivot plane (1*b*) having a width (B) corresponding to a cross-section of a threaded rod (7) capable of passing therethrough. The pivot nut (5) and a marginal zone (9) arranged on both sides of the guide slot (8) each form guide surfaces (10*a*, 10*b*) that are saddle shaped.

17 Claims, 5 Drawing Sheets

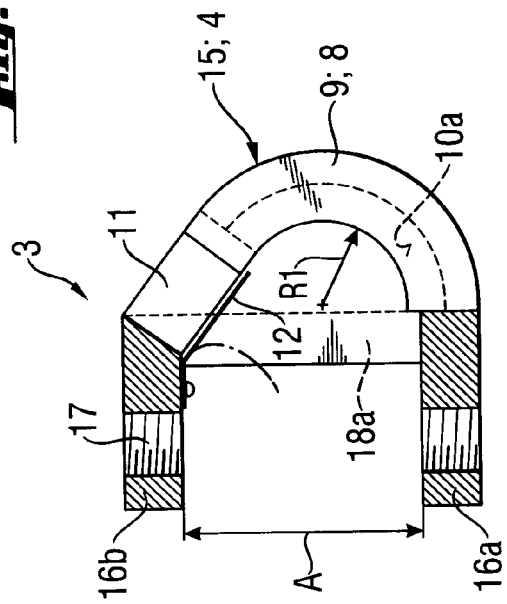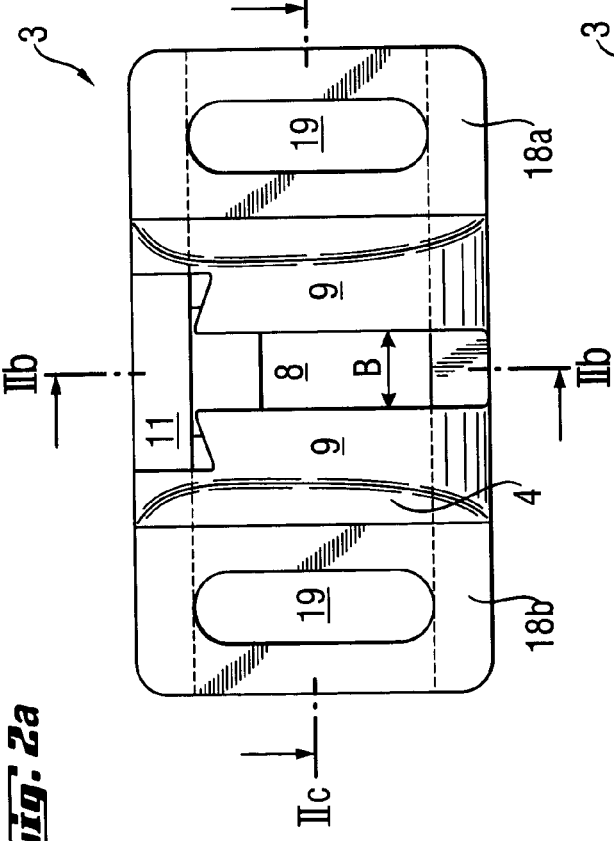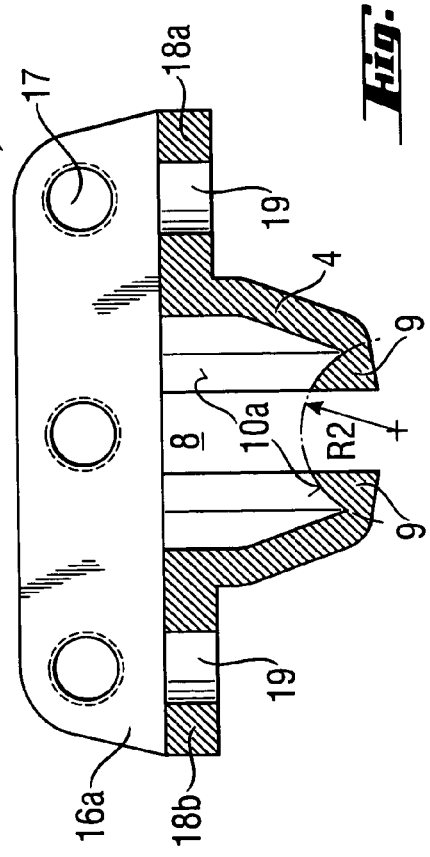

MOUNTING FASTENING

BACKGROUND OF THE INVENTION

The invention relates to a mounting fastening for suspended loads, in particular for mounting rails suspended on mountings for a ceiling or a roof construction.

In industrial halls that are commonly comprised of steel and reinforced concrete constructions, mounting rails are used as fastening means for structural engineering and, in process media, mounting rails are transported in pipes and lines. For large area fastening means, in suspended constructions, mounting rails are suspended gridlike on the hall beams The suspension construction must be executed perpendicular and diagonally from the beam to the rail grid because of the large beam intervals of the support construction. In this case, the diagonal suspension is brought together in node points and connected using junction fasteners.

According to U.S. Pat. No. 4,666,109, fastening devices having longitudinal supports form a spherical socket at their ends, whereby the supports can be swiveled in two different tilt planes. A rigid fixing of the supports in the spherical joint socket is not possible.

According to DE 1 994 6222 C1, pipes are fastened using pipe clips, which are suspended using threaded rods at the ceiling. The threaded rods are fastened at the ceiling using angled suspension mountings, which have a guide slot in a cylindrical sleeve segment shaped section, whereby the threaded rods can be fixed in different pitch angles relative to one axis.

SUMMARY OF THE INVENTION

The object of the invention is to provide a universal mounting construction for suspended loads, which can be fixed rigidly in two pitch angle planes.

This object is achieved, in accordance with the invention, by a mounting construction for suspended loads comprising a mounting connector part having a fastening means with a pivot element socket and an associated pivot nut having an inside thread, which can be pivotally fixed in two pivot planes. The pivot element socket has a guide slot along a first pivot plane having a width that corresponds to the diameter of a threaded rod that can be passed through it, whereby the pivot nut and a bilateral marginal zone on the guide slot each form associated saddle-shaped guide surfaces.

By virtue of the saddle-shaped configuration of the guide surfaces each having precisely one concave and convex canonical curvature as primary curvatures, the pivot nut is pivotally guided within the mounting connector part in two pivot planes.

Advantageously, the guide surface of the mounting connector part has a concave canonical curvature along the guide slot and a convex canonical curvature transverse to the guide slot, whereby a pressure on the guide surface applied by the suspended load causes an automatic closing of the guide slot up to the stop on the through-passing threaded rod, by means of the force exerted by the convex curvature in the even of overload.

Advantageously, the guide surface of the mounting connector part has a pitch range greater than 90° along the guide slot, preferably 120°, and greater than 10° transverse to the guide slot, preferably 20°, whereby the common roof or ceiling slopes in industrial halls can be compensated up to 10°.

Advantageously, the guide slot opens into an insertion opening having at least double the width of the guide slot, whereby a pre-mounted pivot nut already threaded onto a threaded rod can be introduced into the pivot element socket.

Advantageously, the insertion opening has a locking element for locking a previously introduced pivot nut; preferably, a spring locking latch or a barrier arranged opposite to the guide slot, which can be passed only when the pivot nut is introduced outside of the tilt range, whereby an unintentional release of the suspended load from the mounting connector part is reliably prevented.

Advantageously, an inside stop surface is arranged on the end of the pivot nut situated opposite to the guide surface, whereby a threaded rod screwed into the inside thread can be axially locked with the pivot nut even without the use of an additional lock nut.

Advantageously, the mounting connector part is rigidly U-shaped with an arcuate segment having the pivot element socket and two parallel opposing clamp members bilateral longitudinally adjacent to the guide slot and having fasteners, which are preferably through-bores with internal threading for fasting of clamp bolts, whereby the mounting connector part can be affixed in a screw clamp manner at a freely protruding edge of a beam or support section.

Advantageously, the interval between the opposing clamp members is more than double flange thickness of the support or beam section, whereby a specifically angled mounting relative to the beam or support section is possible using a unilateral intermediate spacing member.

Advantageously, the support connector part has two flat mounting flanges having fasteners, which are diametrically offset in a plane and adjacent from the arcuate segment with the pivot element socket bilaterally transverse to the guide slot, which preferably are through-bores for passage of a mounting bolt, whereby the support connector part is such that a clip can be affixed to a free surface.

In particular, two support connector parts arranged bilaterally on a beam or support section can thus be opposing and affixed by two clamp rods.

Advantageously, the support connector part has two clamp members and two mounting flanges, whereby in a support connector part affixed as a linear stop only to a freely projecting edge of a T-support section, tipping of the support connector can be prevented by the clamp member. In addition, a lateral slipping off of the support connector part along the sectional support or beam section is prevented. The support connector part can also be mounted on a transverse rail part mounted transverse to a double T-support section or a concrete support, which is introduced longitudinally between the opposing clamp members.

Alternatively, the support connector part has at least one, preferably two mounting flanges with fasteners, diametrically offset and situated in one plane, adjacent to the arcuate segment with the guide slot. The fastening means are preferably passage bores for passing through a mounting bolt, whereby the support connector part can be affixed as a clip to the free surface, particularly using pins or anchors to concrete supports. Furthermore, a base bracket can be advantageously mounted underneath the support connector part for suspending another threaded rod under the support connector part, which preferably has a plastically deformed bent point. When using a rail frame construction for preventing asymmetrical introductions of force to the support or beam section, the support connector part can be mounted directly on the rail frame construction.

Advantageously, the fastening means configured as passage bore holes are configured as elongated holes along the guide slot, whereby a variable location of the clamp rods, clamp bolts or anchors is possible.

Advantageously, the support connector is a component of a constructively harmonized mounting system comprised of any groups of support connectors, transverse rail parts, support brackets, rail frame constructions, threaded rods, clamping bolts or anchors, whereby the user has interchangeable components available for different situations.

BRIEF DESCRIPTION OF THE DRAWINGS

The exemplary embodiment of the invention will be explained in more detail with reference to the drawings, wherein:

FIG. 2a, 2b, 2c show trilateral views of the support construction, in partial section, in accordance with the invention;

Figure 4A:
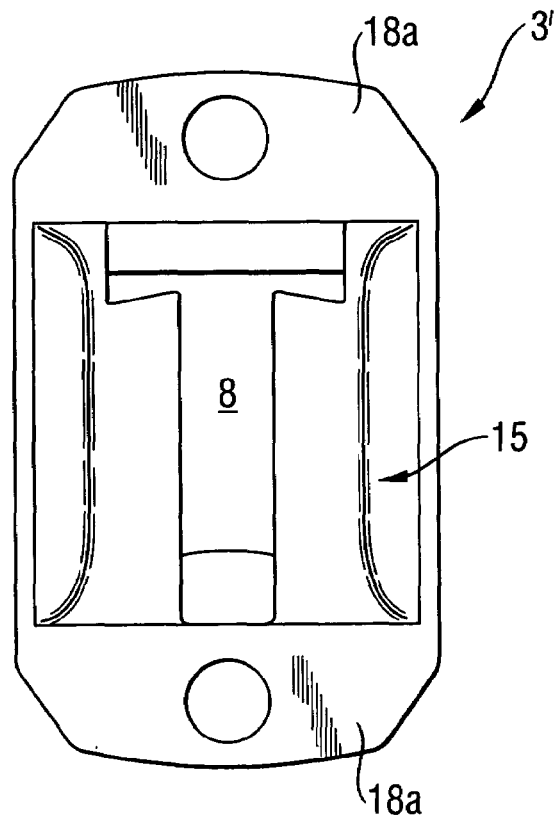
Figure 4B:
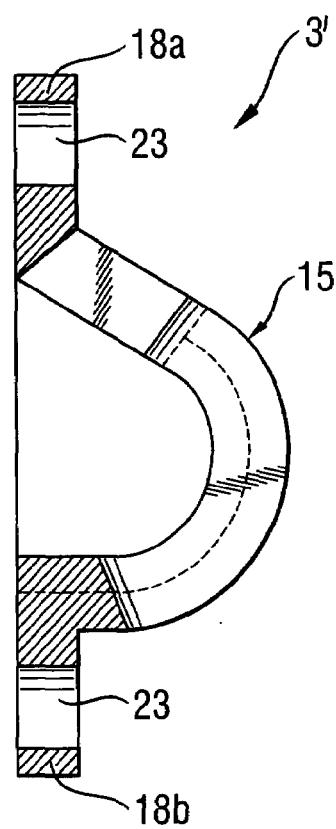
Figure 4C:
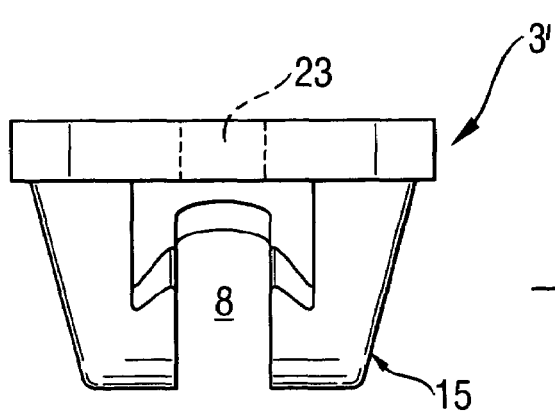
Figure 5:
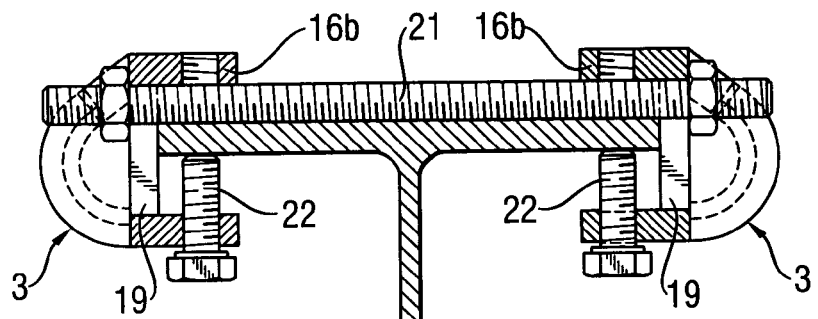
Figure 6:
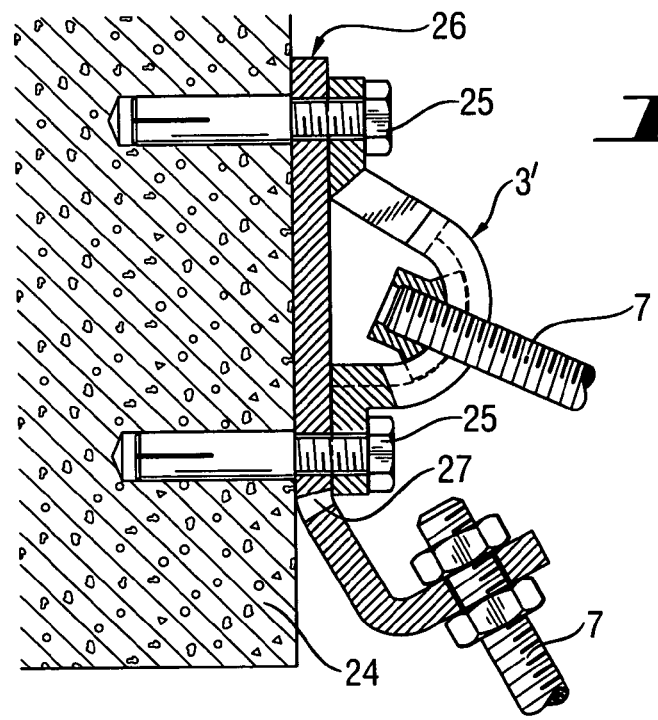

FIG, 3a, 3b, 3c show trilateral views of the pivot nut, in partial section, in accordance with the invention;

FIG. 4a, 4b, 4c show trilateral views of a variant of the support connector part, in partial section, in accordance with the invention; and FIG. 5 shows an exemplary application, in accordance with the invention;

FIG. 6 shows an alternative exemplary application, in accordance with the invention.

DETAILED DESCRIPTION OF THE INVENTION

Figure 1A:
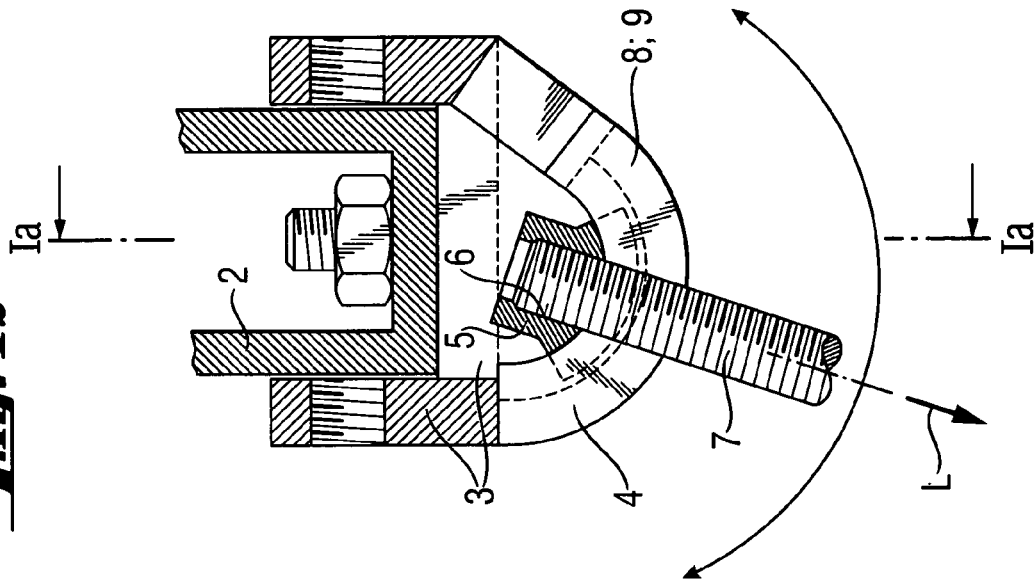
FIG. 1a, 1b show bilateral views of the support construction, in partial section, in accordance with the invention.
Figure 1B:
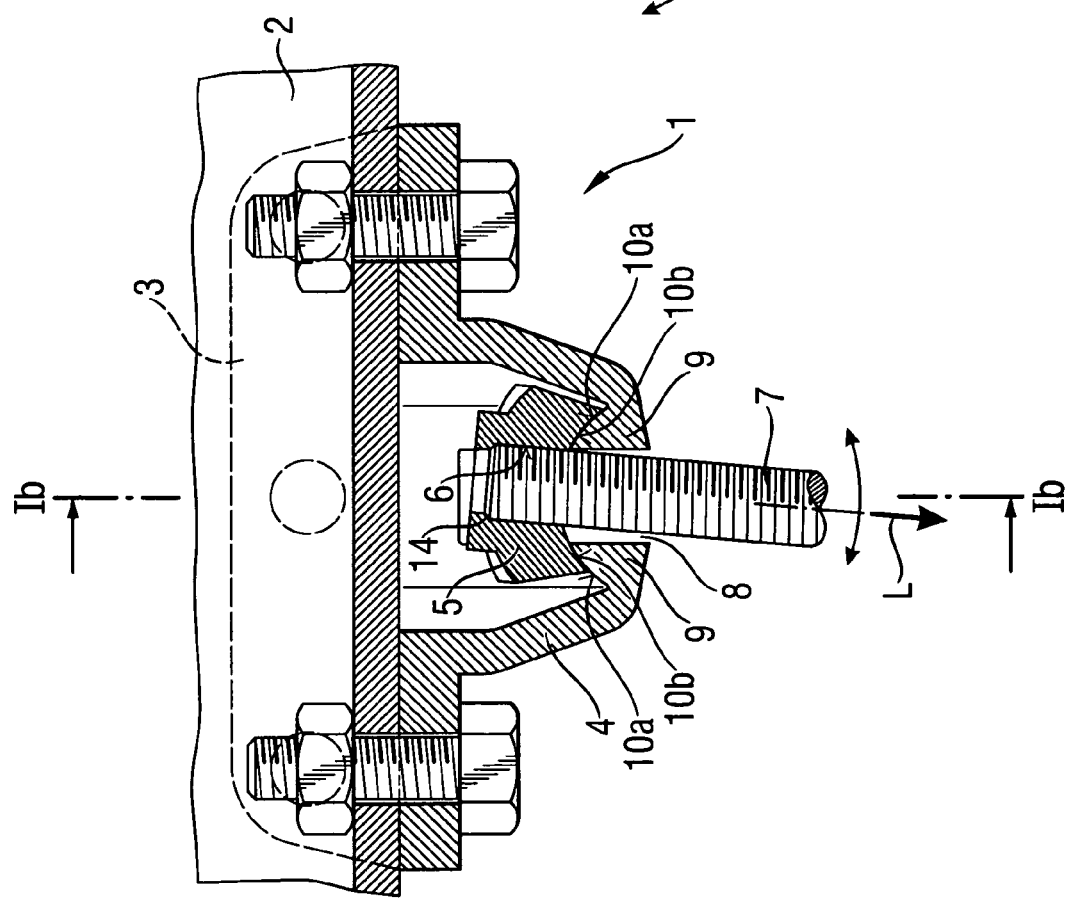

FIGS. 1a and 1b show a support construction 1 for a load L suspended on a beam or support section 2, represented in two pivot planes 1a, 1b, having a support connector part 3 with a pivot element socket 4 and an associated pivot nut 5, pivotably fixable in the pivot plane 1a about 20° and in the pivot plane 1b about 120°. The pivot nut 5 has an inside thread 6, into which a threaded rod 7 can be screwed. The guide surface of the mounting connector part has a pitch range of 120° along the guide slot, and greater than 10° transverse to the guide slot, whereby the common roof or ceiling slopes in industrial halls can be directly compensated up to 10°.

The pivot element socket 4 has a guide slot 8 having a width B along a first pivot plane 11b, as shown in FIGS. 2a, 2b, and 2c. A marginal zone 9 is arranged on both sides of the guide slot 8, which is on the inside of the pivot element socket 4. The pivot element socket 4 forms a saddle-shaped formed guide surface 10a with a constant concave canonical curvature having a first radius R1 along the guide slot 8 and a constant convex canonical curvature with a second radius R2 transverse to the guide slot 8. The guide slot 8 opens into an insertion opening 11 having a width B triple the width of the guide slot 8. The insertion opening has a locking element 12 in the form of a spring latch for locking an inserted pivot nut.

Figure 3A:
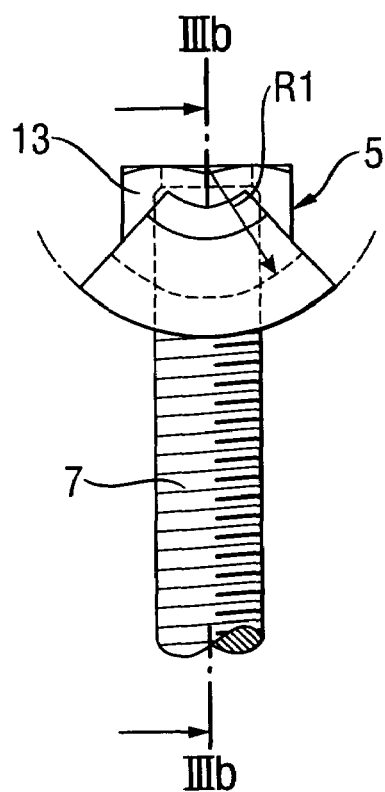
Figure 3B:
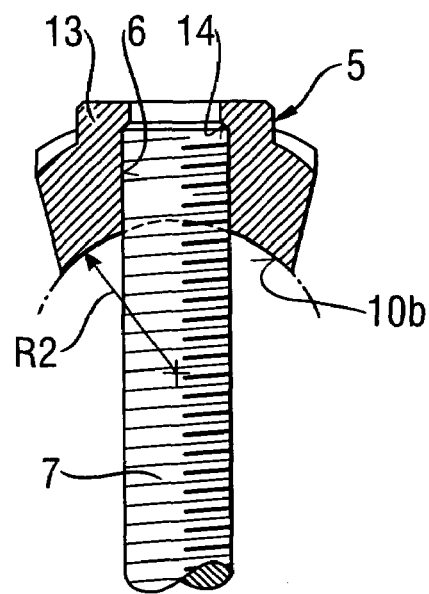
Figure 3C:

The guide surface 10a is configured opposite to guide surface 10b and adapted to the pivot nut 5, as shown in FIGS. 3a, 3b, and 3c. An inner stop surface 14 is associated with the inner thread 6 at which a screwed on threaded rod 7 is clamped. The inner stop surface 14 is situated on end side 13 opposite the guide surface 10b, in the form of a hexagonal head of the pivot nut 5.

The support connector part 3 is a rigid U-shaped screw collar having an arcuate segment 15 with a pivot element socket 4 and two bilateral adjacent longitudinal clamp members 16a, 16b running parallel and opposite each other relative to the guide slot 8 and having fasteners in the form of threaded bores 17. The distance A between the opposing clamp members 16a, 16b is greater than the sum of the flange thickness of the support or beam section 2 (FIG. 5) and the diameter of the intermediate clamp rod 21 (FIG. 5). In addition, the support connector part 3 has two diametrically offset flat mounting flanges 18a, 18b lying in one plane, bilateral and transverse relative to the guide slot 8 and abutted by the arcuate segment 14 with the pivot element socket 4, having fasteners in the form of elongated bores 19 oriented along the guide slot 8.

FIGS. 4a, 4b and 4c show an alternative support connector part 3' having two diametrically offset angled mounting flanges 18a, 18b, lying in one plane, abutted along the support connector part 3' by the arcuate segment 15. The guide slot 8 have fasteners in the form of passage bores 23.

FIG. 5 shows four support connector parts 3 arranged on a double T-shaped support or beam section 2. Each of two support connector parts 3, abutting as a linear stop, are arranged on both sides of the support or beam segment and linearly or transversely abut only at a freely projecting edge 20. Each of the two support connector parts 3 are mutually affixed by clamp rods 21, whereby a tipping of the support connector parts 3 is prevented by the clamp member(s) 16b flatly abutting on the support or beam section 2 or the clamp rods 21 and being clamped by clamp bolts 22.

FIG. 6 shows an alternative support connector part 3', in the form of a clip, fastened on a free lateral surface of a concrete support section 24 by anchors 25, whereby a support bracket 26 is mounted between the concrete support 24 and the support connector part 3' serving as the recipient of a first threaded rod 7. The support bracket 26 is provided for suspension of a second threaded rod 7, said bracket having a plastically deformed intended bending point 27 in the form of a section having recesses. 7.

What is claimed is:

1. A mounting construction for suspending a load (L), the mounting construction comprising:
    a support connector part (3, 3') with fastening means for suspending the load (L) from a support section (2), the support connector part (3, 3') having:
    a pivot element socket (4); and
    an associated pivot nut (5) pivotably fixable at least one pivot plane (1a, 1b), wherein the pivot nut (5) has an inside thread (6),
    wherein the pivot element socket (4) has a guide slot (8) along a first pivot plane (1b) having a width (B) corresponding to a cross-section of a threaded rod (7) capable of passing therethrough, and
    wherein the pivot nut (5) and a marginal zone (9) arranged on both sides of the guide slot (8) each form associated guide surfaces (10a, 10b) that are saddle shaped, such that each of the guide surfaces (10a, 10b) of the support connector part (3, 3') has a concave canonical curvature along the guide slot (8) and a convex canonical curvature transverse to the guide slot (8).

2. The mounting construction of claim 1, wherein the guide surfaces (10a, 10b) have constant canonical curvatures everywhere.

3. The mounting construction of claim 1, wherein the guide surfaces (10a, 10b) of the support connector part (3, 3') have a pitch range of greater than 90° along the guide slot (8) and greater than 10° transverse to the guide slot (8).

4. The mounting construction of claim 1, wherein the guide slot (8) opens into an insertion opening (11) having a width at least double the width (B) of the guide slot (8).

5. The mounting construction of claim 4, wherein the insertion opening (11) has a locking element (12) for locking an inserted pivot nut (5).

6. The mounting construction of claim 5, wherein the locking element (12) is one of a spring latch and a barrier arranged opposite the guide slot (8).

7. The mounting construction of claim 1, wherein an inner stop surface (14) is associated with the inside thread (6) at an end (13) of the pivot nut (4) opposing the guide surface (10b).

8. The mounting construction of claim 1, wherein the support connector part (3, 3') is configured as a rigid U-shape having an arcuate segment (15) with the pivot element socket (4) and two bilateral, parallel opposing clamp members (16a, 16b) that are situated longitudinal to the guide slot (8) and have fastening means.

9. The mounting construction of claim 1, wherein the support connector part (3, 3') has two diametrically offset mounting flanges (18a, 18b) having fastening means, lying in one plane abutted by an arcuate segment (15) having the pivot element socket (4) and being bilateral and transverse to the guide slot (8).

10. The mounting construction of claim 1, wherein the support connector part (3, 3') has two clamp members (16a, 16b) and two mounting surfaces (18a, 18b).

11. The mounting construction of claim 1, wherein the fastening means are configured as elongated holes (19) oriented along the guide slot (8).

12. The mounting construction of claim 1 being a component of a reciprocally constructed matched mounting system comprised of groups of support connectors (3, 3'), at least one support section (2), support brackets (26), rail frame constructions, threaded rods (7), clamp rods (21), clamp bolts (22) and anchors (25).

13. A mounting construction for suspending a load (L), the mounting construction comprising:
 a support connector part (3, 3') with fastening means for suspending the load (L) from a support section (2), the support connector part (3, 3') having:
  a pivot element socket (4); and
  an associated pivot nut (5) pivotably fixable at least one pivot plane (1a, 1b), wherein the pivot nut (5) has an inside thread (6);
 wherein the pivot element socket (4) has a guide slot (8) along a first pivot plane (1b) having a width (B) corresponding to a cross-section of a threaded rod (7) capable of passing therethrough;
 wherein the pivot nut (5) and a marginal zone (9) arranged on both sides of the guide slot (8) each form associated guide surfaces (10a, 10b) that are saddle shaped, such that each of the guide surfaces (10a, 10b) of the support connector part (3, 3') has a concave canonical curvature along the guide slot (8) and a convex canonical curvature transverse to the guide slot (8); and
 wherein the guide slot (8) opens into an insertion opening (11).

14. The mounting construction of claim 13, wherein the insertion opening (11) has a locking element (12) for locking an inserted pivot nut (5).

15. The mounting construction of claim 14, wherein the locking element (12) is one of a spring latch and a barrier arranged opposite the guide slot (8).

16. A mounting construction for suspended loads (L), the mounting construction comprising:
 a support connector part (3, 3') with fastening means for suspending the load (L) from a support section (2), the support connector part (3, 3') having:
  a pivot element socket (4); and
  an associated pivot nut (5) pivotably fixable at least one pivot plane (1a, 1b), wherein the pivot nut (5) has an inside thread (6);
 wherein the pivot element socket (4) has a guide slot (8) along a first pivot plane (1b) having a width (B) corresponding to a cross-section of a threaded rod (7) capable of passing therethrough;
 wherein the pivot nut (5) and a marginal zone (9) arranged on both sides of the guide slot (8) each form associated guide surfaces (10a, 10b) that are saddle shaped; and
 wherein the support connector part (3, 3') has two diametrically offset mounting flanges (18a, 18b) having fastening means, lying in one plane abutted by an arcuate segment (15) having the pivot element socket (4) and being bilateral and transverse to the guide slot (8).

17. A mounting construction for suspending a load (L), the mounting construction comprising:
 a support connector part (3, 3') with fastening means for suspending the load (L) from a support section (2), the support connector part (3, 3') having:
  a pivot element socket (4); and
  an associated pivot nut (5) pivotably fixable at least one pivot plane (1a, 1b), wherein the pivot nut (5) has an inside thread (6);
 wherein the pivot element socket (4) has a guide slot (8) along a first pivot plane (1b) having a width (B) corresponding to a cross-section of a threaded rod (7) capable of passing therethrough;
 wherein the pivot nut (5) and a marginal zone (9) arranged on both sides of the guide slot (8) each form associated guide surfaces (10a, 10b) that are saddle shaped; and
 wherein the support connector part (3, 3') includes:
  two clamp members (16a, 16b); and
  two mounting surfaces (18a, 18b) each extending respectively from one of a pair of ends of the pivot element socket (4), upon which mounting surfaces (18a, 18b) are mounted the two clamp members (16a, 16b) that are situated longitudinal to the guide slot (8).

* * * * *